United States Patent
Doerr et al.

(10) Patent No.: US 7,382,768 B2
(45) Date of Patent: Jun. 3, 2008

(54) REAL-TIME PROTOCOL (RTP) FLOW ANALYSIS USING NETWORK PROCESSOR

(75) Inventors: Bradley S. Doerr, Colorado Springs, CO (US); Steve Luna, Colorado Springs, CO (US); Stewart Jones, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1208 days.

(21) Appl. No.: 10/268,904

(22) Filed: Oct. 11, 2002

(65) Prior Publication Data

US 2004/0071129 A1    Apr. 15, 2004

(51) Int. Cl.
*H04L 12/66* (2006.01)
(52) U.S. Cl. ..................... 370/352; 370/356
(58) Field of Classification Search ........ 370/352–356, 370/328–329, 335, 349
See application file for complete search history.

(56) References Cited

U.S. PATENT DOCUMENTS

| 7,130,282 | B2 * | 10/2006 | Black ......................... 370/352 |
| 2001/0005382 | A1 * | 6/2001 | Cave et al. ................. 370/466 |
| 2004/0022237 | A1 * | 2/2004 | Elliott et al. ................ 370/356 |
| 2004/0057449 | A1 * | 3/2004 | Black ......................... 370/432 |

OTHER PUBLICATIONS

U.S. Patent Application entitled, "Dynamically Controlled Packet Filtering With Correlation to Signaling Protocols," Doerr, et al., filed Oct. 11, 2002.

* cited by examiner

*Primary Examiner*—Suhan Ni

(57) ABSTRACT

An apparatus including a network processor and a host system for monitoring packet communications on a packet network. The network processor captures all packets on a link of the network in real-time, to thereby capture communications transmitted via packet on the link. Each communication has at least one corresponding packet media stream. The host system communicates with the network processor to detect the packet media streams from the captured packets and to analyze the detected packet media streams.

38 Claims, 1 Drawing Sheet

REAL-TIME PROTOCOL (RTP) FLOW ANALYSIS USING NETWORK PROCESSOR

BACKGROUND OF THE INVENTION

1. Field of the Invention

The present invention relates to a network processor and a host system which operate together to capture all Internet Protocol (IP) communications on a link of a high-speed packet network and provide, for example, a quality of service analysis or flow analysis of the captured communications. The communications might be, for example, voice over Internet Protocol (VOIP) telephone calls.

2. Description of the Related Art

Communications are often transmitted over a high-speed, packet network. For example, a communication might be a voice over Internet Protocol (VOIP) telephone call comprised of signaling packets and corresponding Internet Protocol (IP) packet media streams. The signaling packets include information indicating, for example, when the VOIP telephone call is initiated, when the VOIP telephone call ends, what parties are participating in the VOIP telephone call, etc. The signaling packets would typically be based on a signaling protocol such as, for example, SIP. SIP is a well-known protocol used for signaling packets of a VOIP telephone call. However, many other signaling protocols are available.

The packet media streams (often referred to as "flows") are formed of media packets which carry data. If the communication is a VOIP telephone call, the media packets would typically be real-time protocol (RTP) packets. RTP is a well-known protocol used for media packets of a VOIP telephone call.

FIG. 1 is a diagram illustrating the use of a call signaling analyzer to monitor a VOIP telephone call. Referring now to FIG. 1, a call signaling analyzer 4 is directly connected to a network link 6 of a network under test. Call signal analyzer 4 can detect the signaling packets (i.e., the SIP packets) for a respective VOIP telephone call transmitted over network link 6.

However, call signaling analyzer 4 cannot detect the packet media streams (i.e., the RTP packets). Therefore, with call signaling analyzer 4 in FIG. 1, only information conveyed by the signaling packets can be monitored. For example, from the signaling packets, it can be determined when the VOIP telephone call is initiated, when the VOIP telephone call ends, what parties are participating in the VOIP telephone call, etc.

Unfortunately, since call signaling analyzer 4 cannot detect the packet media streams, call signaling analyzer 4 cannot analyze or monitor information conveyed by the packet media streams.

Further, since the processing power of call signaling analyzer 4 is relatively limited, call signaling analyzer 4 can be overwhelmed by all the packets traveling on network link 6. For this reason, call signaling analyzer is typically used to detect and monitor the signaling packets for only a single, respective VOIP telephone call at one time, and cannot simultaneously detect and monitor the signaling packets for all the VOIP telephone calls being transmitted through network link 6.

SUMMARY OF THE INVENTION

Accordingly, the present invention captures all packets on a network link to thereby capture all communications transmitted via packets on the network link, detects packet media streams of the communications from the captured packets, and provides an analysis, such as a quality of service analysis or flow analysis, which takes into consideration the detected packet media streams.

Additional aspects of the invention will be set forth in part in the description which follows, and, in part, will be obvious from the description, or may be learned by practice of the invention.

The present invention provides a method including (a) capturing substantially all packets on a link of a packet network in real-time to thereby capture communications transmitted via packets on the link, each communication having at least one corresponding packet media stream; (b) detecting the packet media streams from the captured packets; and (c) analyzing the detected packet media streams.

The present invention also provides a method including (a) capturing substantially all packets on a link of a packet network in real-time to thereby capture communications transmitted via packets on the link, each communication having corresponding signaling packets and at least one corresponding packet media stream; (b) filtering the captured packets to separate the signaling packets from the packet media streams; (c) analyzing the separated signaling packets to identify the communications; (d) obtaining the packet media streams corresponding to the captured communications from the separated packet media streams, in accordance with the identified communications; (e) producing flow information records for the obtained packet media streams; and (f) analyzing the flow information records.

The present invention also provides an apparatus including (a) a network processor capturing substantially all packets on a link of a packet network in real-time to thereby capture communications transmitted via packets on the link, each communication having at least one corresponding packet media stream; and (b) a host system communicating with the network processor to detect the packet media streams from the captured packets and to analyze the detected packet media streams.

Moreover, the present invention provides an apparatus including (a) a network processor capturing substantially all packets on a link of a packet network in real-time to thereby capture communications transmitted via packets on the link, each communication having corresponding signaling packets and at least one corresponding packet media stream; and (b) a host system communicating with the network processor to filter the captured packets to thereby separate the signaling packets from the packet media streams, analyze the separated signaling packets to identify the communications, identify the packet media streams corresponding to the captured communications from the separated packet media streams in accordance with the identified communications, produce flow information records for the obtained packet media streams, and analyze the flow information records.

In addition, the present invention provides an apparatus including (a) a signaling analyzer; and (b) a network processor capturing substantially all packets on a link of a packet network in real-time to thereby capture communications transmitted via packets on the link, each communication having corresponding signaling packets and at least one corresponding packet media stream. The network processor includes (i) a filter filtering the captured packets to separate the signaling packets from the packet media streams, the separated signaling packets being provided to the signaling analyzer so that the signaling analyzer analyzes the separated signaling packets to identify the communications, and (ii) a flow engine obtaining the packet media streams corresponding to the captured communications from the separated packet media streams in accordance with the communications as identified by the signaling analyzer, and producing flow information records for the obtained packet media streams. An application analyzes the flow information records produced by the flow engine.

Further, the present invention provides an apparatus for capturing packets on a link of a packet network to thereby capture communications transmitted via packets on the link, each communication having corresponding signaling packets and at least one corresponding packet media stream. The apparatus includes (a) a signaling analyzer; (b) a filter capturing substantially all the packets in real-time and filtering the captured packets to separate the signaling packets from the packet media streams, the separated signaling packets being provided to the signaling analyzer so that the signaling analyzer analyzes the separated signaling packets to identify the communications; (c) a flow engine obtaining the packet media streams corresponding to the captured communications from the separated packet media streams, in accordance with the communications as identified by the signaling analyzer, and producing flow information records for the obtained packet media streams; and (d) an application analyzing the flow information records produced by the flow engine.

The present invention provides an apparatus for capturing packets on a link of a packet network to thereby capture communications transmitted via packets on the link, each communication having corresponding signaling packets and at least one corresponding packet media stream. The apparatus includes (a) a signaling analyzer; (b) a filter capturing substantially all the packets on said at least one link in real-time and filtering the captured packets to separate the signaling packets from the packet media streams, the separated signaling packets being provided to the signaling analyzer so that the signaling analyzer analyzes the separated signaling packets and thereby produces call flow records; (c) call flow logic which produces control signals from the call flow records; (d) a flow engine obtaining the packet media streams corresponding to the captured communications from the separated packet media streams, in accordance with the control signals, and producing flow information records for the obtained packet media streams; and (e) an application analyzing the flow information records produced by the flow engine.

In addition, the present invention provides a method including (a) capturing packets on at least one link of a packet network in real-time to thereby capture communications transmitted via packets on said at least one link, each communication having corresponding signaling packets and at least one corresponding packet media stream; (b) filtering the captured packets to separate the signaling packets from the packet media streams; (c) analyzing the separated signaling packets to identify the communications; (d) obtaining the packet media streams corresponding to the captured communications from the separated packet media streams, in accordance with the identified communications; (e) producing flow information records for the obtained packet media streams; and (f) analyzing the flow information records.

BRIEF DESCRIPTION OF THE DRAWINGS

Aspects of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
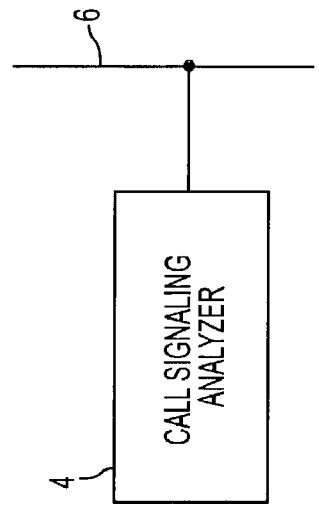
FIG. 1 (prior art) is a diagram illustrating the use of a call signaling analyzer to monitor a VOIP telephone call.

Reference will now be made in detail to the present preferred embodiments of the present invention, examples of which are illustrated in the accompanying drawings, wherein like reference numerals refer to like elements throughout.

Figure 2:
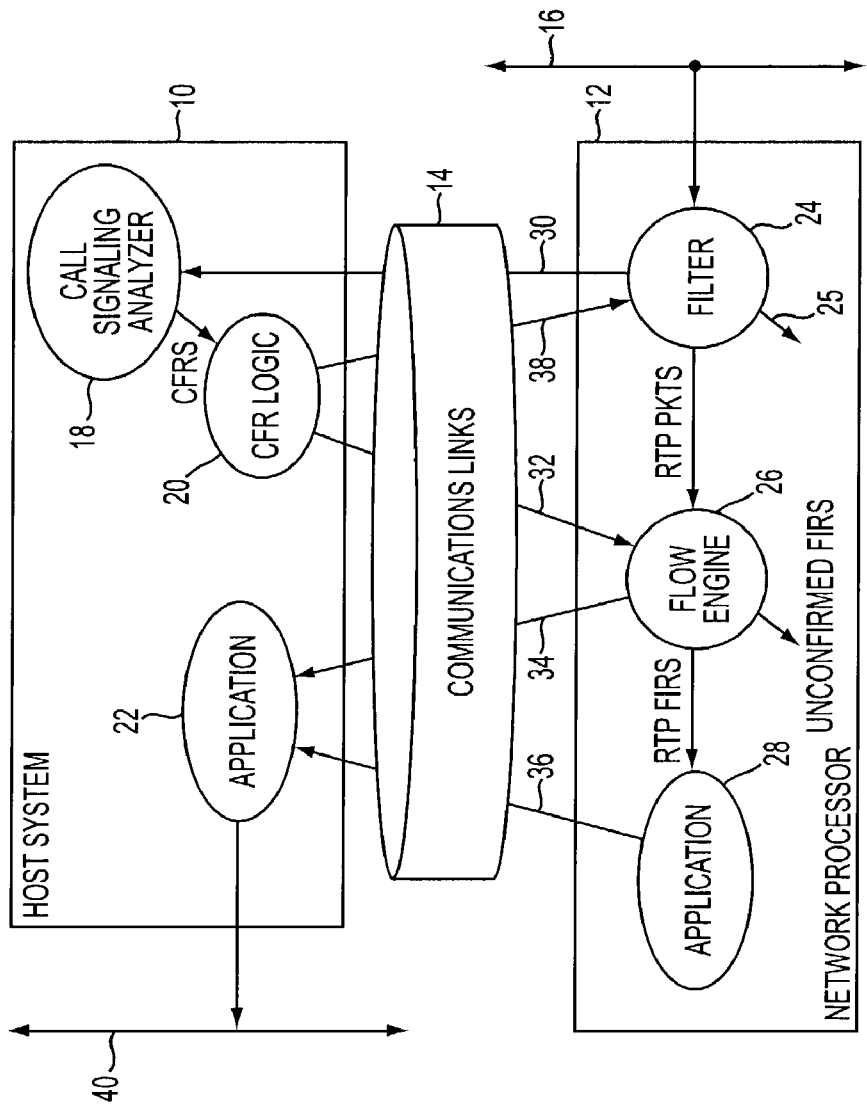
FIG. 2 is a diagram illustrating the use of a network processor and host system to monitor all communications on a network link, according to an embodiment of the present invention.

FIG. 2 is a diagram illustrating the use of a network processor and host system to monitor all communications on a network link, according to an embodiment of the present invention. Referring now to FIG. 2, a host system 10 communicates with a network processor 12 via communication links 14 to monitor communications transmitted through at least one network link 16 of a packet network under test.

The packet network is not limited to being based on any particular network protocol. Moreover, the packet network is not limited to being based on any particular technology, and might be based, for example, on wired technology, wireless technology, electrical technology, optical technology, local area network (LAN) technology, wide area network (WAN) technology, or any combination of these. As an example, the network under test might be the Internet or a private packet network.

Communications transmitted through network link 16 are packet communications which include signaling packets and media packets. Signaling packets include information indicating, for example, when a communication is initiated, when the communication ends, etc. The signaling packets are based on a signaling protocol. Signaling protocols include, for example, SIP, MGCP, H.323, RADIUS, NCS, etc. There are many different signaling protocols that can be used. However, the present invention is not limited to any particular signaling protocol, or any particular information being conveyed by the signaling packets. The use of signaling packets and signaling protocols is well-known.

The media packets carry the data of the communications. In various embodiments of the present invention, the media packets might typically include any type or protocol of streaming media such as, for example, video, voice, email, stock price information, etc. As an example, the present invention is useful for analyzing communications which are voice over Internet Protocol (VOIP) telephone calls. Real-time protocol (RTP) is a protocol used for VOIP phone calls, but there are many other protocols which can be used. Therefore, various embodiments of the present invention relate to the analysis of communications which are VOIP telephone calls with RTP media packets. However, the present invention is not limited to media packets carrying any particular type of data or being based on any particular protocol.

Host system 10 includes, for example, a call signaling analyzer 18, call flow record (CFR) logic 20 and an application 22.

Network processor 12 includes, for example, a filter 24, a flow engine 26 and an application 28. Generally, a network processor is a known device specialized for handling packets. As an example, network processor 12 can be based on the Intel IXP 1200 series network processor. Other manufacturers, such as Motorola and IBM, also produce various types of network processors.

Filter 24 captures substantially all the packets on network link 16 in real-time to thereby capture the communications transmitted via packets on network link 16, and filters the captured packets to separate the signaling packets from the packet media streams. That is, filter 24 separates the signaling packets from the media packets forming the packet media streams. Unmatched packets 25 would, for example, typically be discarded. For example, filter 24 checks every packet captured from network link 16 to determine if the packet is a signaling packet, a media (data) packet, or some other type of packet which should be discarded.

The separated signaling packets are provided to call signaling analyzer 18 via communication link 30 so that call signaling analyzer 18 analyzes the separated signaling packets to thereby identify the communications transmitted on network link 16. Call signaling analyzer 18 produces call flow records (CFRs) which, generally, are condensed summary records of the communications identified by call signaling analyzer 18.

For example, if the communications are VOIP telephone calls, call signaling analyzer 18 analyzes the separated signaling packets to identify VOIP telephone calls. For example, as part of the identification of a VOIP telephone call, call signaling analyzer 18 might identify when a VOIP telephone call is initiated or discontinued. Call signaling analyzer 18 would then produce corresponding CFRs.

There are many different ways that call signaling analyzer 18 can identify a communication. For example, to identify a communication, a call signaling analyzer 18 might analyze, for example, starts/stops, the IP addresses and/or ports that the media will be on for that call. Accordingly, there are many different ways in which call signaling analyzer 18 can identify a communication from signaling packets, and the present invention is not limited to any particular manner. Moreover, the identification of a call from analyzing signaling packets is known. Further, call signal analyzers, such as call signal analyzer 18 are known devices for analyzing signaling packets.

CFR logic 20 produces control signals from the CFRs produced by call signaling analyzer 18. Generally, the control signals are for controlling flow engine 26 in accordance with the communications as identified by call signaling analyzer 18. The control signals can be provided to flow engine 26 by, for example, communication link 32. Generally, CRF logic 20 obtains information in the form of CFRs from call signaling analyzer 18 and transmits appropriate commands to network processor 12 to capture flows corresponding to identified communications. Generally, CFR logic 20 is a translator between call signaling analyzer 18 and network processor 12. For example, if call signaling analyzer 18 identifies a communication as a conference call between a plurality of participants, CFR logic 20 would send appropriate control signals to flow engine 26 to capture all the packet media streams corresponding to the conference call. The control signals might be, for example, signals that provide direct instructions to flow engine 26, or might simply be information regarding the communications and which is used by flow engine 26 to formulate it's own instructions or commands. Therefore, the control signals are not limited to including any specific information or being any specific type of command.

Accordingly, from the media packets separated by filter 24, flow engine 26 obtains the packet media streams corresponding to the captured communications in accordance with the control signals, and produces flow information records (FIRs) for the obtained packet media streams. Generally, FIRs are summaries of the packets that arrived on a respective packet media stream corresponding to a respective communication. Typically, a FIR might include an identifier for the respective communication. Moreover, typically, a FIR might indicate what computer is the originator of the packet media stream, what computer is the destination of the packet media stream, etc. However, there are many different types of information that could be included in a FIR, and the present invention is not limited to a FIR including any specific information.

If flow engine 26 does not receive appropriate control signals indicating that a respective packet media stream should be monitored or analyzed, in some embodiments of the present invention flow engine 26 might simply discard the FIRs for the respective packet media stream. By discarding FIRs for packet media streams which do not appear to be relevant, the workload of flow engine 26 can be reduced.

Applications 28 and 22 are software-based application which analyze the FIRs to produce useful information, such as, for example, a quality of service analysis, a flow analysis, management alarms, statistics, data records for subsequent applications, etc. Such information might be useful, for example, to a network administrator accessing host system 10 through management network 40. Communication link 34 can be used to forward FIRs from flow engine 26 to application 22. Communication link 36 can be used to send flow results to host system 10.

FIG. 2 shows the use of applications 22 and 28. In various embodiments of the present invention, applications 22 and 28 might be, for example, the same application, different applications, serial components of the same application, or non-serial components of the same application. Therefore, a respective application can reside on host system 10 and/or network processor 12. In this manner, if desired, application processing can be shared between host system 10 and network processor 28, or scaling can be easily accomplished.

In embodiments of the present invention, a communication link 38 might also be provided to allow host system 10 to dynamically reconfigure network processor 12 to capture the necessary signaling protocols, send the appropriate signaling packets to call signaling analyzer 18 and/or send appropriate media packets to flow engine 26. For example, in such embodiments, CFR logic 20 produces filter control signals for dynamically reconfiguring filter 24 in accordance with the analysis of the separated signaling packets by call signaling analyzer 18. In this manner, as an example, as communication protocols change, filter 24 can be dynamically reconfigured and appropriate media packets can be relayed to flow engine 26.

Generally, the present invention recognizes that a very large number of packets can travel over a high-speed network link, where the packets correspond to a plurality of communications transmitted over the network link. Of these packets, only a very small percentage are signaling packets. For example, in a typical network, approximately 5% or less of the packets traveling over the network might be signaling packets. Therefore, the present invention combines the use of network processor 12 with host system 10 to capture preferably all the packets on network link 16, separate the signaling packets from the remaining packets, identify the communications from the signaling packets, detect the packet media streams of the captured communication in accordance with the identified communications, and analyze the detected packet media streams.

More specifically, network processors are optimized devices for handling packets. Therefore, in embodiments of the present invention, network processor 12 is responsible for passively capturing, for example, 100% of the packets on network link 16 and classifying the packets into FIRs. Packet classification is accomplished, for example, by first discarding any packets that are not potentially useful, such as, for example, non-signaling. For example, if the communications are VOIP telephone calls, non-signaling packets and non-RTP packets may be discarded. Network processor 12 then forwards the signaling packets to call signaling analyzer 18 of host system 10 and waits for host system 10 to indicate the start and completion of packet media streams (i.e., RTP flows). Meanwhile, network processor 12 continues to capture all media packets (such as RTP packets for VOIP telephone calls) and produces corresponding FIRs. Network processor 12 stores the FIRs until host system 10 identifies communications to which the packet media streams correspond. When a communication is identified, network processor 12 can begin forwarding FIRs for the packet media streams corresponding to the identified communication to application 28 and/or application 22. If FIRs are being stored, and a respective communication is not identified for a packet media stream to which the stored FIRs correspond, then the stored FIRs would typically be discarded after a specific amount of time. In various embodiments of the present invention, network processor 12 can either forward the FIRs to host system 10 or can compute high-level results from the FIRs and forward the high-level results to host computer 10.

Accordingly, network processor 12 can, for example, process substantially all packets on network link 16 and produce comprehensive results in, for example, real-time. Network processor 12 accomplishes this with hardware specialized for processing packets, and by communicating to host system 10 in real-time and dynamically reconfiguring itself to handle high traffic levels. Network processor 12 can, for example, produce comprehensive FIRs in real-time for all packet media streams (i.e., flows) on a high-speed packet network link. Accordingly, for example, all packet media streams found on network link 16 can be captured and condensed into FIRs which can then be processed by host system 10 and/or network processor 12. This allows host system 10 and/or network processor 12 to perform high level computations on the packet media streams and to produce, for example, a quality of service analysis and/or additional flow analysis.

By appropriately using applications 22 and 28 and the processing power of host system 10 and/or network processor 12, scalability and load balancing can be improved.

Although processing is described above as being performed in real-time, the present invention is not limited to such performance in real-time. For example, FIRs might be analyzed in non-real-time. Also, flow engine 26 might produce the FIRs in non-real-time.

The following is an example of the operation of host system 10 and network processor 12 in FIG. 2, according to an embodiment of the present invention. Assume that 10,000 VOIP telephone calls are traveling over network link 16, and that it is desired to monitor the quality of service of the telephone calls. Each VOIP telephone call includes signaling packets and media packets. For this example, it will be assumed that the signaling packets are based on the SIP protocol, and the media packets are real-time protocol (RTP) packets. Other packets, such as those relating to email, http, etc., also travel over network link 16. For this example, it will be assumed that CFR logic 20 has initially configured filter 24 to send SIP packets to call signaling analyzer 18 and to send RTP packets to flow engine 26.

Therefore, in this example, filter 24 captures all packets traveling over network link 16, and filters the captured packets to separate the signaling packets (e.g., the SIP packets) from the media packets (e.g., the RTP packets). Filter 24 sends the signaling packets to call signaling analyzer 18, and sends the RTP packets to flow engine 26. Filter 25 discards the other packets, such as those relating to email, http, etc.

Flow engine 26 stores all the RTP packets until it knows what to do with them. Call signaling analyzer 18 collects the SIP packets, analyzes the collected SIP packets to identify respective VOIP telephone calls, and produces corresponding CFRs. CFR logic 20 analyzes the CFRs and determines what packet media streams correspond to each identified VOIP telephone call. For example, with a VOIP telephone call, there would typically be two packet media streams corresponding to each VOIP telephone call—one packet media stream from the originating party to the destination party, and one packet media stream from the destination party to the originating party. In a conference call, there might be a plurality of packet media streams corresponding to the respective conference call. CFR logic 20 then sends appropriate control signals to flow engine 26 so that flow engine 26 can obtain the packet media streams corresponding to the identified VOIP telephone calls. For example, flow engine 26 might check a buffer (not illustrated) and retrieve the RTP packets in the buffer that pertain to the two packet media streams corresponding to a respective, identified VOIP telephone call. For this respective VOIP telephone call, flow engine 26 will keep collecting new RTP packets until it receives an indication from call signaling analyzer 18 that the VOIP telephone call has ended.

Eventually, SIP packets for the respective VOIP telephone call will be captured to indicate that the VOIP telephone call will end. Filter 24 sends these packets to call signaling analyzer 18. Call signaling analyzer 18 then sends CFRs to CFR logic 20 which indicate that the VOIP telephone call will end. CFR logic 20 then sends control signals to flow engine 26 to indicate that the packet media streams for that VOIP telephone call are finished. Accordingly, flow engine 26 stops collecting RTP packets for the respective VOIP telephone call, and sends appropriate FIRs to application 22 and/or application 28, so that a quality of service analysis or additional flow analysis can be performed. Flow engine 26 might send FIRs simultaneously to RTP application 22 and/or application 28 as the VOIP telephone call is in progress, or flow engine 26 might wait for the VOIP telephone call to end, depending on the embodiment.

Therefore, for example, by analyzing the signaling packets, call signaling analyzer 18 recognizes when a new VOIP telephone call is being set up. Call signaling analyzer 18 then causes network processor 12 to be controlled to capture the RTP packets for the respective VOIP telephone call. In this manner, call signaling analyzer 18 operates together with network processor 12 to capture and analyze the RTP packet media streams for all the VOIP telephone calls transmitted on network link 16.

Therefore, in embodiments of the present invention, call signaling analyzer 18 can dynamically configure network processor 12 so that network processor 12 captures the right packets at the right time. More specifically, by analyzing the signaling packets, call signaling analyzer 18 directs network processor 12 to, for example, capture, categorize, correlate and analyze the different packet media streams. For example, if 10,000 VOIP telephone calls are being transmitted over network link 16, call signalizing analyzer 18 helps network processor 12 handle this full load of work as the VOIP telephone calls are being set up and ended. In this manner, call signaling analyzer 18 and network processor can capture 100% of the VOIP telephone calls transmitted over network link 16.

Moreover, as described above, in various embodiments of the present invention, filter 24 discards packets which are not related to the communications which are to be monitored. Similarly, as described above, in various embodiments of the present invention, if flow engine 26 does not receive appropriate control signals indicating that a respective packet media stream should be monitored or analyzed, flow engine 26 discards the FIRs for the respective packet media stream. Such discarding of packets and FIRs allows network processor 12 to keep up with a high speed network link 16 through which a very large number of packets are being transmitted.

The present invention is not limited to any particular location of host system 10 and network processor 12 in relation to each other. For example, host system 10 and network processor 12 might be physically located in the same room of the same building, or might be located remotely (for example, in different rooms of the same building, in different buildings, in different cities or in different countries) from each other. Host system 10 and network processor 12 might even be connected to each other from remote locations via an appropriate communication link such as, for example, the Internet. Moreover, applications 22 and 28 are not limited to being in any specific location, or to being on host system 10 or network processor 12. For example, application 22 and/or 28 might be located remotely from host system 10 and/or network processor 12, and be appropriately connected to host system 10 and/or network processor 12 via an appropriate communication link, such as via, for example, the Internet.

FIG. 2 shows communications links 14 (which includes respective communication links 32, 34, 36 and 38) to communication between various devices in host system 10 and network processor 12. However, the specific arrangement of communication links in FIG. 2 is only intended as an example, and there are many possible variations of communication links which can be used to allow communication between the various devices in host 10 and network processor 12. Moreover, communication links 14 are not limited to any particular technology and might be based, for example, wired technology, wireless technology, electrical technology, optical technology, local area network (LAN) technology, wide area network (WAN) technology, or any combination of these. Moreover, communication links 14 are not limited to any communication protocol. As an example, communication links 14 might be the Internet. Therefore, the present invention is not limited to any specific arrangement of communication links.

The network under test, which includes network link 16, might be a high-speed network. The present invention is especially useful with a high-speed network, as network processor 12 has the ability to capture and filter all packets traveling on network link 16. Generally, a high-speed network would have a clock rate greater than 10 megabits/s. However, the present invention is not limited for use with a high-speed network.

Moreover, network link 16 in FIG. 2 could represent multiple links in a network under test. For example, network processor 12 could be used to capture packets at multiple points in a network under test. In FIG. 2, network link 16 would represent such multiple points.

Here, a "link", such as network link 16, is simply intended to indicate some type of communication line on the network. Thus, network link 16 might represent, for example, a point at the output of a switch, router or other device on a network. Or, as an example, network link might be a point along a communication line connecting two nodes of the network under test.

Various examples described herein relate to communications which are Internet Protocol (IP), or real-time protocol (RTP) voice communications (i.e., voice over internet (VOIP) telephone calls). However, the present invention is not limited to such communications, or to any particular protocols.

Therefore, according to embodiments of the present invention, all packets on a link of a packet network are captured in real-time, to thereby capture all communications transmitted via packets on the link. The packet media streams of all the captured communications are detected an analyzed. The communications are, for example, VOIP telephone calls. The packet media streams are comprised of, for example, RTP packets.

According to embodiments of the present invention, all packets on a link of a packet network are captured in real-time, to thereby capture communications transmitted via packets on the link. The captured packets are filtered to separate the signaling packets from the packet media streams. The separated signaling packets are analyzed to identify the communications. The packet media streams corresponding to the captured communications are then obtained in accordance with the identified communications. For example, in above embodiments of the present invention, call signaling analyzer 18 identifies communications by analyzing the signaling packets. Flow engine 26 then obtains the packet media streams corresponding to the captured communications in accordance with the communications as identified by call signaling analyzer 18. FIRs for the obtained packet media streams are then produced and analyzed to provide, for example, a quality of service analysis or additional flow analysis.

As indicated above, separated signaling packets are analyzed to identify the communications. The present invention is not limited to any particular information being required to identify a communication, or to any particular information being communicated to indicate that a communication has been identified. Similarly, as indicated above, packet media streams corresponding to the communications are obtained. The present invention is not limited to any particular information being required to obtain a packet media stream, or to any particular information being required to indicate that a packet media stream has been obtained.

As shown in FIG. 2, host system 10 includes, for example, a call signaling analyzer 18, call flow record (CFR) logic 20 and an application 22. However, the present invention is not limited to a host system including these specific elements in the specific configuration shown in FIG. 2. Instead, various modifications are possible.

Similarly, as shown in FIG. 2, network processor 12 includes, for example, a filter 24, a flow engine 26 and an application 28. However, the present invention is not limited to a network processor including these specific elements in the specific configuration shown in FIG. 2. Instead, various modifications are possible.

As indicated above, applications 22 and 28 can be used to provide, for example, a quality of service analysis or flow analysis. However, applications 22 and 28 are not limited to providing any particular type of analysis. Instead, applications 22 and 28 simply provide desired, useful information.

In various of the above embodiments of the present invention, a network processor is described as capturing "all" packets transmitted through at least one network link. In many embodiments, it may be possible to capture 100% of the packets. However, the present invention is not limited to capturing 100% of the packets. For example, it is often difficult or unnecessary to capture 100% of the packets. Therefore, in embodiments of the present invention, a network processor might capture "substantially all" the packets. Here, "substantially all" the packets indicates that, for example, at least 90%, and more preferably at least 95%, of the packets are captured.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:
capturing substantially all packets on at least one link of a packet network in real-time to thereby capture multiple communications transmitted via packets on said at least one link, each communication having corresponding signaling packets and at least one corresponding packet media stream;
filtering the captured packets to separate the signaling packets from the packet media streams;
analyzing the separated signaling packets to identify the communications;
obtaining the packet media streams corresponding to the captured communications from the separated packet media streams, in accordance with the identified communications;
producing flow information records for the obtained packet media streams; and
analyzing the flow information records.

2. A method as in claim 1, wherein said capturing and said obtaining the packet media streams are performed by a network processor, and said analyzing the separated signaling packets is performed by a call signaling analyzer.

3. A method as in claim 2, wherein the network processor is at a remote location from the call signaling analyzer, and the network processor and the call signaling analyzer communicate with each other via communication links.

4. A method as in claim 1, wherein the communications are real-time protocol (RTP) communications.

5. An apparatus comprising:
a network processor capturing substantially all packets on at least one link of a packet network in real-time to thereby capture multiple communications transmitted via packets on said at least one link, each communication having corresponding signaling packets and at least one corresponding packet media stream; and
a host system communicating with the network processor to filter the captured packets to thereby separate the signaling packets from the packet media streams, analyze the separated signaling packets to identify the communications, identify the packet media streams corresponding to the captured communications from the separated packet media streams in accordance with the identified communications, produce flow information records for the obtained packet media streams, and analyze the flow information records.

6. An apparatus as in claim 5, wherein the network processor is at a remote location from the host system.

7. An apparatus as in claim 5, wherein the communications are real-time protocol (RTP) communications.

8. An apparatus as in claim 6, wherein the communications are real-time protocol (RTP) communications.

9. An apparatus comprising:
a signaling analyzer; and
a network processor capturing substantially all packets on at least one link of a packet network in real-time to thereby capture multiple communications transmitted via packets on said at least one link, each communication having corresponding signaling packets and at least one corresponding packet media stream, the network processor including:
a filter filtering the captured packets to separate the signaling packets from the packet media streams, the separated signaling packets being provided to the signaling analyzer so that the signaling analyzer analyzes the separated signaling packets to identify the communications, and
a flow engine obtaining the packet media streams corresponding to the captured communications from the separated packet media streams in accordance with the communications as identified by the signaling analyzer, and producing flow information records for the obtained packet media streams; and
an application analyzing the flow information records produced by the flow engine.

10. An apparatus as in claim 9, wherein the signaling analyzer is located remotely from the network processor and communicates with the network processor via communication lines.

11. An apparatus as in claim 9, further comprising:
a host system which includes the signaling analyzer.

12. An apparatus as in claim 9, wherein the filter is dynamically reconfigured in accordance the analysis of the separated signaling packets by the signaling analyzer to filter the captured communications.

13. An apparatus as in claim 9, further comprising:
a host system which includes the signaling analyzer and is located remotely from the network processor, the host system communicating with the network processor via communication lines.

14. An apparatus as in claim 9, wherein the application resides on at least one of the group consisting of the network processor and a host system which includes the signaling analyzer.

15. An apparatus as in claim 9, wherein the communications are real-time protocol (RTP) communications.

16. An apparatus as in claim 10, wherein the communications are real-time protocol (RTP) communications.

17. An apparatus for capturing packets on at least one link of a packet network to thereby capture multiple communications transmitted via packets on said at least one link, each communication having corresponding signaling packets and at least one corresponding packet media stream, the apparatus comprising:
a signaling analyzer;
a filter capturing substantially all the packets in real-time and filtering the captured packets to separate the signaling packets from the packet media streams, the separated signaling packets being provided to the signaling analyzer so that the signaling analyzer analyzes the separated signaling packets to identify the multiple communications;

a flow engine obtaining the packet media streams corresponding to the captured communications from the separated packet media streams, in accordance with the communications as identified by the signaling analyzer, and producing flow information records for the obtained packet media streams; and an application analyzing the flow information records produced by the flow engine.

18. An apparatus as in claim 17, further comprising:
a network processor which includes the filter and the flow engine; and
a host system which includes the signaling analyzer.

19. An apparatus as in claim 18, wherein the network processor is located remotely from the host system and communicates with the host system via communication lines.

20. An apparatus as in claim 17, further comprising:
a network processor which includes the filter and the flow engine; and
a host system which includes the signaling analyzer and the application.

21. An apparatus as in claim 20, wherein the network processor is located remotely from the host system and communicates with the host system via communication lines.

22. An apparatus as in claim 17, wherein the application is included on at least one of the group consisting of the network processor and the host system.

23. An apparatus as in claim 17, wherein the communications are real-time protocol (RTP) communications.

24. An apparatus as in claim 18, wherein the communications are real-time protocol (RTP) communications.

25. An apparatus as in claim 18, wherein the host system dynamically reconfigures the filter of the network processor in accordance the analysis of the separated signaling packets by the signaling analyzer to capture and filter the communications.

26. An apparatus for capturing packets on at least one link of a packet network to thereby capture multiple communications transmitted via packets on said at least one link, each communication having corresponding signaling packets and at least one corresponding packet media stream, the apparatus comprising:
a signaling analyzer;
a filter capturing substantially all the packets on said at least one link in real-time and filtering the captured packets to separate the signaling packets from the packet media streams, the separated signaling packets being provided to the signaling analyzer so that the signaling analyzer analyzes the separated signaling packets and thereby produces call flow records;
call flow logic which produces control signals from the call flow records;
a flow engine obtaining the packet media streams corresponding to the captured multiple communications from the separated packet media streams, in accordance with the control signals, and producing flow information records for the obtained packet media streams; and
an application analyzing the flow information records produced by the flow engine.

27. An apparatus as in claim 26, further comprising:
a network processor which includes the filter and the flow engine; and
a host system which includes the signaling analyzer and the call flow logic.

28. An apparatus as in claim 27, wherein the network processor is located remotely from the host system and communicates with the host system via communication lines.

29. An apparatus as in claim 26, further comprising:
a network processor which includes the filter and the flow engine; and
a host system which includes the signaling analyzer, the call flow logic and the application.

30. An apparatus as in claim 29, wherein the network processor is located remotely from the host system and communicates with the host system via communication lines.

31. An apparatus as in claim 27, wherein the application is included on at least one of the group consisting of the network processor and the host system.

32. An apparatus as in claim 26, wherein the communications are real-time protocol (RTP) communications.

33. An apparatus as in claim 26, wherein call flow logic produces filter control signals to dynamically reconfigure the filter in accordance the analysis of the separated signaling packets by the signaling analyzer to capture and filter the communications.

34. An apparatus as in claim 27, wherein call flow logic produces filter control signals to dynamically reconfigure the filter in accordance the analysis of the separated signaling packets by the signaling analyzer to capture and filter the communications.

35. A method comprising:
capturing packets on at least one link of a packet network in real-time to thereby capture multiple communications transmitted via packets on said at least one link, each communication having corresponding signaling packets and at least one corresponding packet media stream;
filtering the captured packets to separate the signaling packets from the packet media streams;
analyzing the separated signaling packets to identify the communications;
obtaining the packet media streams corresponding to the captured communications from the separated packet media streams, in accordance with the identified communications;
producing flow information records for the obtained packet media streams; and
analyzing the flow information records.

36. A method as in claim 35, wherein said capturing and said obtaining the packet media streams are performed by a network processor, and said analyzing the separated signaling packets is performed by a call signaling analyzer.

37. A method as in claim 36, wherein the network processor is at a remote location from the call signaling analyzer, and the network processor and the call signaling analyzer communicate with each other via communication links.

38. A method as in claim 35, wherein the communications are real-time protocol (RTP) communications.

* * * * *